Feb. 18, 1964
G. H. RAINBOW
3,121,490
CONVEYOR APPARATUS
Filed Aug. 15, 1960
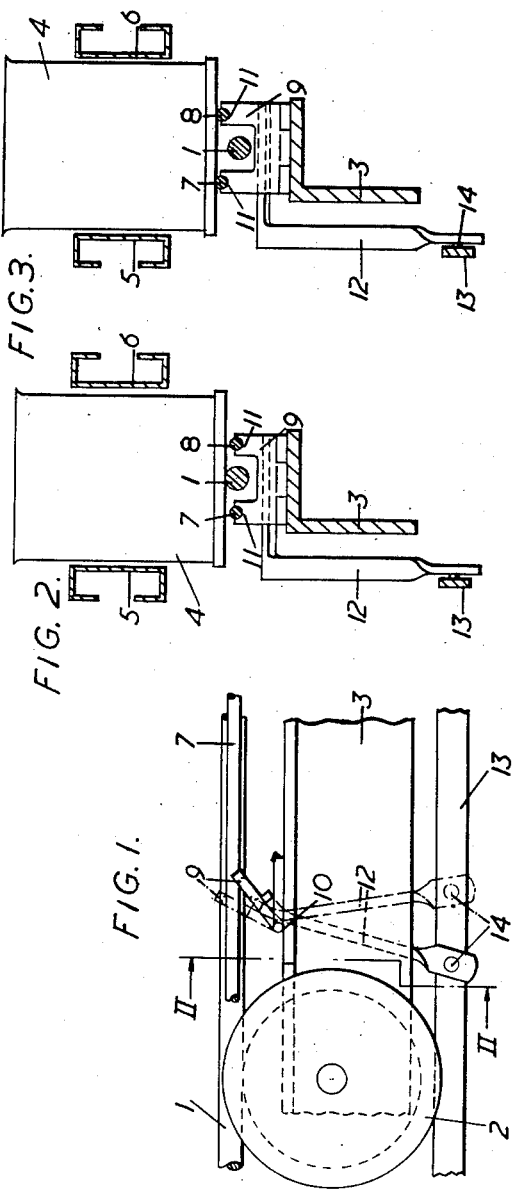
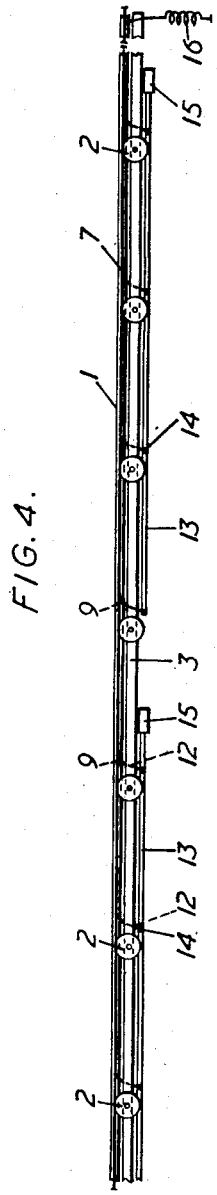
Inventor
George Henry Rainbow
By
Mason, Porter, Diller & Stewart
Attorney

United States Patent Office 3,121,490
Patented Feb. 18, 1964

3,121,490
CONVEYOR APPARATUS
George Henry Rainbow, Gerrard's Cross, England, assignor to The Metal Box Company Limited, London, England, a British company
Filed Aug. 15, 1960, Ser. No. 49,622
Claims priority, application Great Britain Sept. 30, 1959
5 Claims. (Cl. 198—130)

This invention relates to conveyor apparatus of the kind in which articles are conveyed between guides while resting on a continuously movable endless conveyor such as a wire rope, a cable, a chain, or a belt.

In can making and canning factories it is usual for empty, or filled, cans to be conveyed over long distances while resting upright on a continuously movable endless conveyor which moves the cans between guides which prevent them from falling off the conveyor. It is found, however, that when, for any reason, continuity of the movement of the cans is interrupted the cans build up on the conveyor and, because movement of the conveyor is not interrupted, tend to jostle each other so that decoration of the cans becomes damaged or impaired and the bottoms of the cans tend to be grooved by the rubbing action of the conveyor thereon.

Further, the jostling of the cans and the rubbing of the conveyor against the bottoms of the cans creates undesirable noise.

It is a main object of the present invention to overcome or reduce the above-mentioned disadvantages and with this object in view there is provided conveyor apparatus of the kind in which articles are conveyed between guides while resting on a continuously movable endless conveyor, including means operable to effect relative movement between the conveyor and articles resting thereon in a manner such as to cause the articles to be spaced from the conveyor and supported in arrested positions thereof while permitting continued movement of the conveyor.

In order that the invention may be clearly understood an embodiment thereof will now be described, by way of example, with reference to the accompanying diagrammatic drawings, in which:

FIG. 1 is a side elevation of a part of the conveyor apparatus according to the invention, FIG. 2 is a section in line II—II, FIG. 1, FIG. 3 is a view similar to FIG. 2 but in which some parts occupy different positions thereof, and FIG. 4 is a diagrammatic side elevation of a part of the conveyor apparatus.

Referring to the drawings, the conveyor apparatus, in known manner, comprises an endless conveyor illustrated as a rope or cable 1, for example made of wire or nylon, or which may be a chain or a belt, hereinafter referred to as a conveyor, supported at intervals along its length by grooved wheels 2, FIGS. 1 and 4, supported for rotation by bracket members 3 which extend lengthwise of the conveyor cans 4, which may be empty or filled, are supported in an upright position by the conveyor for movement thereby, as illustrated in FIG. 2, and are moved between guides 5, 6 arranged to prevent the cans from falling off the conveyor.

In accordance with the invention, lifting elements 7, 8 extend lengthwise along opposite sides of the run of the conveyor on which the cans rest and in the normal position thereof, FIG. 2, the lifting elements 7, 8 are arranged below the path of the cans resting on the conveyor. The lifting elements 7, 8 are, however arranged to be movable by actuating means 9 to a position, FIG. 3, above the path of the cans so as to move the cans from the conveyor 1 while permitting continued movement of the conveyor.

As illustrated in the drawings, the actuator means 9 comprise element-engaging members supported by the bracket members 3 to be rockable about pivot pins 10, FIG. 1, to and from the can-engaging positions of the lifting elements 7, 8. The actuators 9 comprise U-shaped members, FIGS. 2 and 3, with the pivots 10 arranged at the bases thereof, and the limbs of each U-shaped member are located one each on opposite sides of the conveyor 1. Each said limb has a groove 11 in which one of the lifting elements 7, 8 is located.

Operating means connected with actuator members 9 to effect rocking thereof about their pivots 10 comprise a lever 12 for each actuator member and an actuator bar 13 common to all levers 12 of a group thereof. The bar 13 is arranged for lengthwise movement and the levers are pivotally connected, as at 14, to the bar. Operation, that is lengthwise movement, of the bar 13 is effected selectively by any suitable means indicated diagrammatically by block 15, FIG. 4. Thus the selectively operable means 15 may comprise a solenoid-actuated, a pneumatically-actuated, a hydraulically-actuated, or a mechanically-actuated device operation of which is initiated and terminated by a can-operated pressure-responsive switch, not shown.

As illustrated in FIG. 4, the actuator members 9 may be arranged in groups with the actuator members of each group having an actuator bar common thereto. By this means different sections of the lifting elements 7, 8, considered lengthwise thereof, can be caused to raise cans from the conveyor at different times as a build up of cans on the conveyor is created along particular parts of the length of the conveyor.

The lifting elements 7, 8 preferably consist of wires each having one end anchored to a fixed anchor and the other end resiliently anchored as by a spring 16, FIG. 4, the spring-loading of the wires permitting movement thereof by the actuator members 9 of the raised positions, FIG. 3, of the wires.

From the foregoing description it will be understood that relative movement is effected between the conveyor and articles in a manner such as to cause the articles to be spaced from the conveyor and supported in arrested positions thereof while permitting continued movement at the conveyor. It will also be understood that, if desired, a single lifting element may be employed instead of the two elements 7, 8 or that the spacing may be effected by moving the conveyor downwards away from the bottoms of the articles and providing stationary supports which extend beneath the path of the articles and on which the articles are deposited when the conveyor is moved downwards away from the articles.

Conveyor apparatus as herein described is of particular use in the conveying of cans but it will be understood that it may be used for conveying other articles if so desired.

I claim:

1. A conveyor apparatus comprising an endless conveyor adapted to convey a line of articles along a predetermined path, means operable to effect relative movement between the conveyor and the articles resting thereon to cause the line of articles to be spaced above the conveyor and supported in rested position while permitting continued movement of the conveyor, said means including at least one elongated flexible lifting element extending lengthwise of the conveyor below the path of articles resting on the conveyor in a first position thereof, said elongated flexible lifting element being anchored at each end thereof below the conveyor and tensioned by a resilient member, and element engaging means for effecting movement of a portion of the lifting element against the tension afforded by the resilient member to a position above the path thereby raising the line of articles above the conveyor.

2. The conveyor apparatus as defined in claim 1 wherein said elongated flexible lifting element is a wire.

3. The conveyor apparatus as defined in claim 2 wherein the resilient member tensioning the lifting element lengthwise of the conveyor is a spring effecting spring-loading of the wire to permit biased movement of the lifting element to a position above the predetermined path.

4. The conveyor apparatus as defined in claim 3 wherein said element engaging means for effecting movement of the lifting element comprise U-shaped members pivoted at the bases thereof, the limbs of each U-shaped member being located one each on opposite sides of the conveyor and having a groove within the upper surfaces of each rim contoured to the configuration of the at least one elongated flexible lifting element.

5. The conveyor apparatus as defined in claim 3 wherein the element engaging means comprises a plurality of element-engaging members supported for pivotal movement to and from the article-engaging position of said lifting element, and operating means connected with said members to effect rocking thereof about the pivots, said operating means including a lever for each element engaging member, and an actuator bar common to all said levers, and selectively operable means connected with said actuated bar to effect lengthwise movement thereof thereby pivoting each element engaging member through its respective lever for moving the lifting element to a position above the predetermined path.

References Cited in the file of this patent

UNITED STATES PATENTS

| 2,296,201 | Carter | Sept. 15, 1942 |
| 2,889,031 | Hopkins et al. | June 2, 1959 |

FOREIGN PATENTS

| 1,062,162 | Germany | July 23, 1959 |